*(12)* United States Patent
Feiertag et al.

(10) Patent No.: US 9,830,453 B1
(45) Date of Patent: Nov. 28, 2017

(54) DETECTION OF CODE MODIFICATION

(71) Applicant: tCell.io, Inc., San Francisco, CA (US)

(72) Inventors: Michael Feiertag, San Francisco, CA (US); Garrett Held, San Francisco, CA (US); Blake Livingston, San Francisco, CA (US)

(73) Assignee: tCell.io, Inc., San Francisco, CA (US)

( * ) Notice: Subject to any disclaimer, the term of this patent is extended or adjusted under 35 U.S.C. 154(b) by 9 days.

(21) Appl. No.: 14/929,155

(22) Filed: Oct. 30, 2015

(51) Int. Cl.
*G06F 21/00* (2013.01)
*G06F 21/56* (2013.01)

(52) U.S. Cl.
CPC .................................. *G06F 21/562* (2013.01)

(58) Field of Classification Search
CPC ..................................................... G06F 21/562
See application file for complete search history.

(56) References Cited

U.S. PATENT DOCUMENTS

| | | | | |
|---|---|---|---|---|
| 8,578,482 B1* | 11/2013 | Yang | ....................... | G06F 21/51 726/22 |
| 8,949,990 B1* | 2/2015 | Hsieh | .................... | G06F 21/577 726/22 |
| 9,021,593 B2* | 4/2015 | Liu | .......................... | G06F 21/53 707/999.003 |
| 9,032,519 B1* | 5/2015 | Maher | ..................... | H04L 63/08 709/223 |
| 9,049,222 B1* | 6/2015 | He | ....................... | H04L 63/1416 |
| 9,154,492 B2* | 10/2015 | Chu | ....................... | G06F 21/128 |
| 9,231,975 B2* | 1/2016 | Johns | ...................... | H04L 63/20 |
| 9,509,714 B2* | 11/2016 | Sivan | .................. | H04L 63/1466 |

\* cited by examiner

*Primary Examiner* — Beemnet Dada
(74) *Attorney, Agent, or Firm* — Van Pelt, Yi & James LLP

(57) ABSTRACT

A system for detecting unusual code operating in a browser agent comprises a processor and a memory. The processor is to: determine that a block of code is running on a web page; parse the block of code into a parsed template; obtain indicia associated with the block of code; and determine that the parsed template is unusual based at least in part on the parsed template and the indicia. The memory is coupled with the processor and is configured to provide the processor with instructions.

17 Claims, 16 Drawing Sheets

750

| Hour | 1 | 2 | 3 | 4 | 5 | 6 |
|---|---|---|---|---|---|---|
| New Script Count | 3 | 0 | 2 | 0 | 0 | 1 |
| All Scripts | Script-a<br>Script-b<br>Script-c | Script-a<br>Script-b<br>Script-c | Script-a<br>Script-b<br>Script-c<br>Script-x<br>Script-y | Script-a<br>Script-b<br>Script-c<br>Script-x<br>Script-y | Script-a<br>Script-b<br>Script-c<br>Script-x<br>Script-y | Script-a<br>Script-b<br>Script-c<br>Script-x<br>Script-y<br>Script-insert |
| New Scripts This Hour | Script-a<br>Script-b<br>Script-c | Script-a<br>Script-b<br>Script-c | Script-a<br>Script-x<br>Script-y | Script-a<br>Script-x | Script-b<br>Script-y | Script-insert<br>Script-b<br>Script-c<br>Script-y |

FIG. 7B

Possible Desktop Malware on User With IP=1.2.3.4

Header (IP meta data)

- Client IP = X
- Browser = Firefox
- User Agent(s)=Mozilla/5.0 (Windows NT 6.1; WOW64; rv:36.0) Gecko/20100101 Firefox/36.0
- Location = Chicago
- Client Reputation: OK
- Graph of total site activity from this client IP (page views/time bucket)
- Page view count for this IP Indicator 1: This user is contacting lots of suspicious domains

| Host | Category | Reputation | Directive | Count | Portion of IPs that have Reported this Violation |
|---|---|---|---|---|---|
| jsgnr.eshopcomp.com | Malware | high-risk | connect-src | 1 | 3/10,000 |
| secure.blkz2x.com | | moderate-risk | frame-src | 3 | 1/10,000 |
| cdnstats-a.akamaihd.net | CDN | moderate-risk | img-src | 1 | 1/10,000 |
| static.re-markit00.re-markit.co | General Web | moderate-risk | frame-src | 1 | 1/10,000 |
| s.srv-itx.com | Parked Domain | moderate-risk | connect-src | 1 | 1/10,000 |
| cdncache-a.akamaihd.net | CDN | moderate-risk | default-src | 1 | 1/10,000 |
| canvaspl-a.akamaihd.net | CDN | moderate-risk | img-src | 1 | 1/10,000 |
| pstatic.eshopcomp.com | | low-risk | frame-src | 2 | 1/10,000 |
| app.eshopcomp.com | | trustworthy | img-src | 2 | 1/10,000 |
| i.simpli.fi | General Web | trustworthy | img-src | 1 | 1/10,000 |
| ib.adnxs.com | Web Services | trustworthy | frame-src | 1 | 1/10,000 |
| app.eshopcomp.com | | trustworthy | connect-src | 1 | 1/10,000 |
| Show Others | | | | | |

FIG. 12A

Indicator 2: The user is running scripts that look like they've been injected by a browser extension

| Script Id | Name | Type | Script | Location | Count | Doc URIs | Portion of IPs that report this script |
|---|---|---|---|---|---|---|---|
| -1306513078 | | | `function fghjktghndfgt_init() {`<br>`  new function () {`<br>`    if (!document.getElementById('?')) {`<br>`      (function () {`<br>`        var a = document.createElement('?');`<br>`        a.id = '?';`<br>`        a.setAttribute('?', '?');`<br>`        var c = document.getElementsByTagName('?')['?'];`<br>`        c && c.appendChild(a);`<br>`      })();`<br>`      var a = this;`<br>`      ...`<br>`      '?' < a.watcherCount || a.manhattanOn || (a.watcherCount++,`<br>`a.openWatcher());`<br>`    }, a.overrideDispatchEvent(), a.openWatcher = function () {`<br>`      a.timeout = setTimeout(a.overrideWindowOpen, '?');`<br>`    }, a.openWatcher(), '?' == typeof window[a.prefix] &&`<br>`(window[a.prefix] = a));`<br>`  }`<br>`  })();`<br>`}`<br>`;`<br>`fghjktghndfgt_init();` | End of `<body>` | 10 | 5/6 | 10/10,000 |
| 1241217767 | DealPly | AdWare | `(function () {`<br>`  try {`<br>`    if (typeof window['?'] === '?') {`<br>`      setTimeout(function () {`<br>`        var shouldThisPartOfCodeRun = document.URL.search('?') ===`<br>`'?';`<br>`        if (!shouldThisPartOfCodeRun) {`<br>`          return;`<br>`        }`<br>`        if (typeof DealPly !== '?' && typeof DealPly.serverCallParam ===`<br>`'?') {` | End of `<head>` | 6 | 5/6 | 2/10,000 |
| Show Others ||||||||

FIG. 12B

Possible XSS Attack for user with IP=2.3.4.5

Indicator 1: Suspicious script found

| Script Id | Script | Location | Similar to | Count | Doc URIs | Portion of IPs that report this script |
|---|---|---|---|---|---|---|
| -1804513730 | jQuery(document).ready(function (jQuery) { jQuery.ajax({'?':'?'}); alert('?'); }); | Inside Body. Depth = 3<br>3rd of 4 nodes inside parent. | -183452497 show diff<br>jQuery(document).ready(function (jQuery) { jQuery.ajax({'?':'?'}); });<br><br>-1731751168 show diff<br>jQuery(document).ready(function (jQuery) { jQuery.ajax({'?':'?'}); e.foo(); }); | 10 | 2/500 | 5/10,100 |

Show Others

Indicator 2: Suspicious URLs accessed

| Host | Category | Reputation | Directive | Count | Portion of IPs that have reported this violation |
|---|---|---|---|---|---|
| https://malwarehost.com | NA | Moderate Risk | img-src | 10 | 5/10,1000 |

Show Others

FIG. 13

Indicator 1: Suspicious script found

| Script Id | Script | Location | Context | Count | Doc URIs | Portion of IPs that report this script |
|---|---|---|---|---|---|---|
| -1804513730 | alert("?") | Inside Body. Depth = 3. 3rd of 4 nodes inside parent. | <h6 class="kicker" style="margin-left: 16px;"> <span class="kicker-label"><a href="http://www.nytimes.com/pages/nyregion/index.html">N.Y. / Region</a> </span><span class="pipe">|</span>2 Federal Agents in Silk Road Case Face Fraud Charges<script>alert("pwn")</script> </h6> | 10 | 2/500 | 5/10,100 |

Show Others

Indicator 2: Suspicious URLs accessed

| Host | Category | Reputation | Directive | Count | Portion of IPs that have reported this violation |
|---|---|---|---|---|---|
| https://malwarehost.com | NA | Moderate Risk | img-src | 10 | 5/10,1000 |

Show Others

FIG. 14

Possible CSP Policy Misconfiguration

Note: Scope of these reports is all users, not just one c-ip.

Header (meta data)
- Graph of this set of violations vs traffic (separate axis) - (similar to the data in 2.0 XSS Dashboard but use timechart from 2.3)
- Number of effected users/c-ips (percentage or x of y) - (similar to 2.3 Inline Script Config)
- Browsers - (similar to 2.3 Inline Script Config)

Indicator 1 : High Volume of CSP violations representing a significant uptick from normal

| Blocked Host | URL Category | URL Reputation | Directive | Count | ~~Total Unexplained violations Last Week~~ | Portion of c-ips reporting violation |
|---|---|---|---|---|---|---|
| s3.amazonaws.com | General Web | Trustworthy | img-src | 11,000 | ~~2,000~~ | 2,000 of 25,000 |

Note: Unexplained violations are CSP violations that we didn't explain away as being generated by browser extensions. If the previous reporting indicates that a specific c-ip has an extension, it's violations will be excluded from this calculation. (note: let's add this later if we have the metric. I don't believe we have a metric for this - BC)

Indicator 2: Most users are reporting violations from specific document URIs

| Document URI (No QP) | Blocked URI (No QP) |
|---|---|
| https://amber.balatarin.com/permlink/2015/3/19/3826309 | * |
| | /*(chrome) |
| | /bala.static/topic_photos/1015745/large.jpg |
| | /bala.static/topic_photos/1015746/large.jpg |
| | /bala.assets/avatars/medium/missing.png |
| http://amber.balatarin.com/ | * |
| | /*(chrome) |
| | http://s3.amazonaws.com/bala.assets/assets/logo-footer-2ccc82477a01758140244304cbb7d23b.png |
| | http://s3.amazonaws.com/bala.assets/avatars/small/missing.png |
| | http://s3.amazonaws.com/bala.static/avatars/19097/small.jpg |
| | http://s3.amazonaws.com/bala.static/avatars/27028/small.jpg |
| | http://s3.amazonaws.com/bala.assets/assets/logo-ca62cd743ba4a3daed982eeabce78385.svg |
| | http://s3.amazonaws.com/bala.static/avatars/36562/small.jpeg |
| | http://s3.amazonaws.com/bala.static/avatars/42088/small.jpg |
| | http://s3.amazonaws.com/bala.static/avatars/55136/small.jpg |
| | May be one entry. May be hundreds, depending on site structure. |

FIG. 15

Possible Script Policy Misconfiguration

| Script ID | Template | Source | Category | Count | Portion of IPs reporting this violation | |
|---|---|---|---|---|---|---|
| 1530542709 | var NREUMQ = NREUMQ \|\| [];<br>NREUMQ.push([<br>'?',<br>new Date().getTime()<br>]); | New Relic | Web Service | 20,000 | 9,500 of 10,000 | see doc URIs<br><br>see events |
| -225121402 | var container = document.getElementById('?');<br>var button = document.getElementById('?');<br>if (!window.location.host.match('?')&&<br>document.cookie.indexOf('?') == '?') {<br>container.style.display = '?';<br>}<br>window.domainCheckDismiss = function () {<br>container.style.display = '?';<br>document.cookie = '?';<br>}; | Unknown | Unknown | 19,500 | 9,300 of 10,000 | see doc URIs<br><br>see events |

FIG. 16

DETECTION OF CODE MODIFICATION

BACKGROUND OF THE INVENTION

The internet enables users to have access to a large number of websites that provide useful information and services. However, the access also enables bad actors to interact with the systems interacting via the internet in a malicious way. For example, webpage information can be altered to deliver code that runs either on a user system or a website provider system that performs undesired actions (e.g., supplying information, retrieving confidential content, displaying advertisements, causing payment transfers, etc.).

BRIEF DESCRIPTION OF THE DRAWINGS

Various embodiments of the invention are disclosed in the following detailed description and the accompanying drawings.

FIG. 7B is a diagram illustrating an embodiment of a table for determining a cross-site scripting issue.

FIGS. 12A and 12B are tables illustrating an embodiment of a malware scenario.

FIG. 13 is a table illustrating an embodiment of an XSS injected into an existing script scenario.

FIG. 14 are tables illustrating an embodiment of a new script scenario.

FIG. 15 are table illustrating an embodiment of a CSP misconfiguration scenario.

FIG. 16 is a table illustrating an embodiment of an in-line script policy misconfiguration scenario.

DETAILED DESCRIPTION

Figure 1:
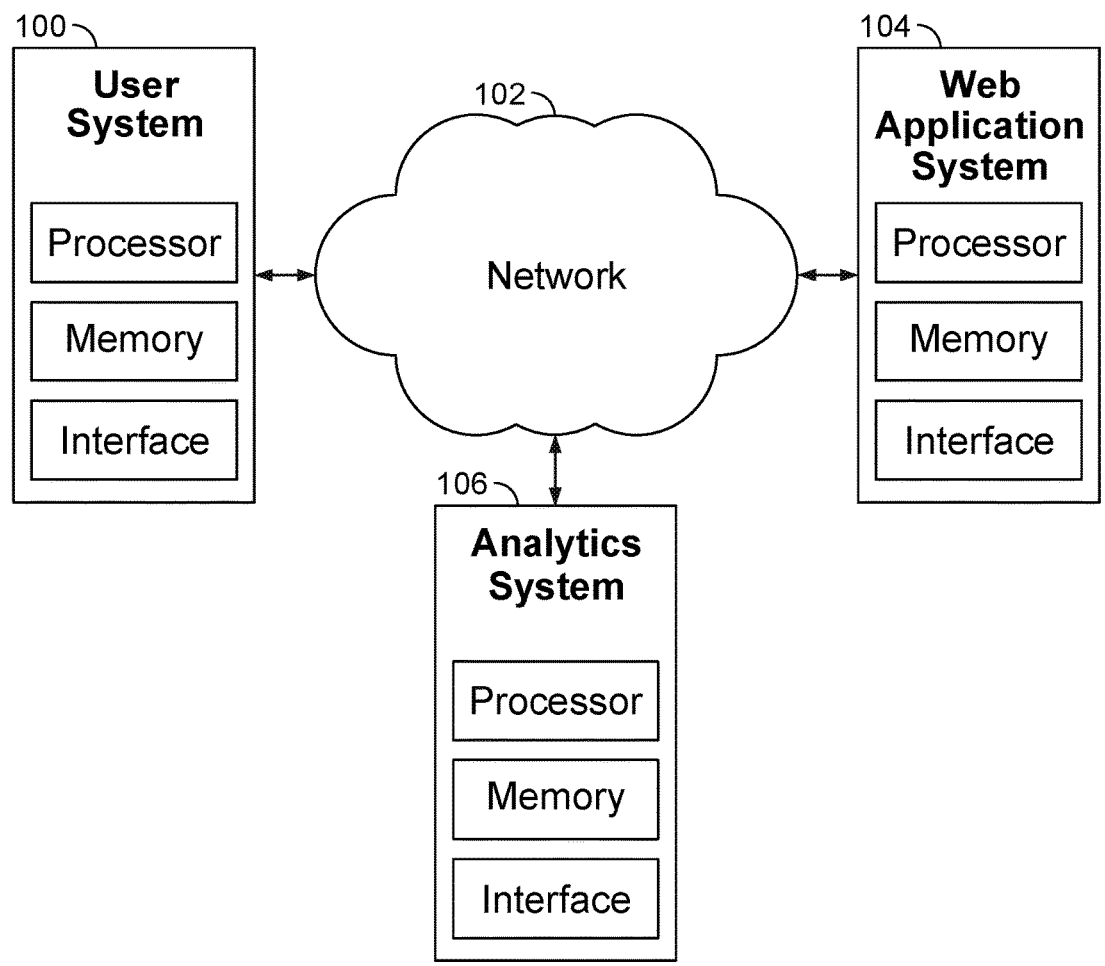
FIG. 1 is a block diagram illustrating an embodiment of a system for detecting unusual code operating in a browser.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for detecting unusual or malicious code operating in a browser is disclosed. The system comprises a processor and a memory. The processor is to perform the following: determine that a block of code is running on a web page; parse the code into a parsed template; obtain indicia of observed templates; compare the indicia of observed templates to the parsed template; and determine that the parsed template is unusual or malicious. In some embodiments, the memory is coupled to the processor and is configured to provide the processor with instructions.

In some embodiments, a system for providing security for modern web applications is disclosed. The system is enabled using one or more low impact browser agents that execute in a browser running a web application to detect undesired code. In various embodiments, a browser agent runs inside a web browser, a client application, or any other appropriate application. A browser agent acts as an information source providing an analytics system with information about code running as a result of a user viewing a web page. The browser agent inspects all code (e.g., javascript code) that executes in the browser. Each code block, typically an in-line script, is transformed into a template that is invariant with respect to application state. For example, strings, like a user name, are removed leaving only the function names and code structure. Generally, the template comprises a parsed version of a code block that replaces constants and variables with a generic symbol as well as collapses a series of constants into one generic symbol. The browser agent receives indications from the analytics system regarding which script templates are trusted for this application. In the event that the browser agent observes a script template that is not trusted, it sends a message to the analytics system indicating so. In some embodiments, the templates are hashed to make detection of the templates rapid. In some embodiments, Content Security Policy (CSP) headers are sent by a server agent to the browser agent to detect and control which objects can be used to assemble the web page. CSP, which is a commonly used standard supported by all modern web browsers, supports policies restricting which domains that a browser can pull scripts, images, style sheets and similar objects from. In the system, CSP is used to compliment the browser agent as a way to observe and control browser behavior when loading a protected web page or application.

In some embodiments, a system for determining users experiencing potential security issues without scanning all event data is disclosed. In some embodiments, a table is used to track the IDs of in-line scripts with issues and associated data (e.g., time bucket, user IP address, script identifier (e.g., a hash), issue type (e.g., cross-site scripting (XSS), malware, etc.), etc.). This table is used to quickly look up all users that have run malicious scripts, or to look up all malicious scripts run by a user. In some embodiments, a table is used to track possible script misconfigurations, for example, the script IDs that correspond to scripts that are not likely malicious but not currently on the user defined whitelist, and associated information (e.g., time bucket, script identifier (e.g., a hash), etc.). In some embodiments, a table is used to track content security policy (CSP) misconfiguration issues and associated data (e.g., time bucket, blocked domain, IP address, directive, confirmed, etc.). A CSP misconfiguration means, in this context, that the system is receiving CSP violation events for browser activity that is likely part of the normal operation of the application. In some embodiments, a table is used to track known scripts associated with commonly used browser extensions, adware, malware or similar and associated data (e.g., script identifier (e.g., a hash), tags (e.g., malware, OK extension, not OK extension, OK, etc.), etc.).

In some embodiments, processing of an event comprises: 1) checking whether the event corresponds to the loading of an in-line script; 2) checking whether a script is part of the configured whitelist for the application; 3) checking whether the script corresponds to a known misconfiguration issue (e.g., when the script ID is in a probable script misconfiguration table within last N time buckets); 4) checking whether the script is associated with known malware (e.g., in the event that script ID is in known scripts table as malware); 5) checking whether script is in the known script table as a non-malicious extension (e.g., labeled as OK, etc.); and 6) adding to an appropriate table (e.g., script ID is added to the script issues table with an indicator of whether the script corresponds to a likely XSS attack or is an instance of desktop malware or the script ID is added to the table of likely script misconfigurations).

In some embodiments, processing of an event comprises: 1) checking whether the event corresponds to a CSP violation; 2) checking whether the event matches a whitelist of allowed content security policies (e.g., using a particular directive and blocked domain, etc.); 3) checking whether a blocked domain category is not in spyware, adware, or malware lists or whether a blocked domain uniform record identifier (URI) is not a high risk domain; and 4) adding the event data to the appropriate table. For example, the domain and directive are added to the table of likely CSP misconfigurations, or the event data is added to the table tracking IPs with possible XSS or malware issues.

In some embodiments, CSP and in-line script events triggered by the same page view are correlated in an analytics system using the following mechanism: 1) when processing an http request, the server agent generates a random id, "server_side_request_id" (SSRID); 2) the server agent includes the SSRID as a query parameter of the report URL in the Content Security Policy header sent to the browser; 3) when processing the page, the browser agent generates a random "client_side_request_id" (CSRID); the CSRID is of the form "aaaa.bbbb.cccc.dddd" such that "01000.aaaa.bbbb.cccc.dddd" is a valid, non-routable IPv6 address; 4) all script violations are reported to the analytics system with the CSRID; 5) the browser agent triggers a CSP violation to this domain, for example by issuing an XHR request to "https://01000.aaaa.bbbb.cccc.dddd"; 6) the browser will then send a CSP report to the tcell service containing blocked domain=01000.aaaa.bbbb.cccc.dddd (i.e., the CSRID) with a report uniform record identifier (URI) that includes the SSRID; 7) the analytics system can then correlate any CSP violation containing the SSRID with any in-line script violations with the corresponding CSRID.

FIG. 1 is a block diagram illustrating an embodiment of a system for detecting unusual code operating in a browser. In the example shown, user system 100 is connected to network 102 that accesses web application system 104. In various embodiments, network 102 comprises one or more of the following: a wired network, a wireless network, a cellular network, the internet, the world wide web, or any other appropriate network. A user using user system 100 uses a web browser to access web application system 104. For example, a user executes a web browser on user system 100 (e.g., a computer system, a desktop, a laptop, a mobile device, etc.) and accesses a website hosted by web application system 104 via the internet. Web application system 104 provides to user system 100 code to display the website. The browser dynamically renders the code—for example, adding code to run (e.g., adding ads, etc.). User system 100 provides web application system 104 foreign code that is run by web application system 104 (e.g., returning an input page with user input data). In some embodiments, the foreign code is run by web application system 104 and is stored on web application system 104 and provided later to other users accessing the website (e.g., to be run on other user systems and enabling unintended access to the user system data). In some embodiments, the foreign code is run by web application system 104 that enables unintended accesses to data of web application system 104.

In the example shown in FIG. 1, analytics system 106 monitors code running as part of a web interaction and uses a browser agent and a server agent. The agents provide information to analytics system 106 and receive policies from analytics system 106 describing normal, non-malicious behavior. The agent(s) uses these policies to decide whether browser behavior is typical or abnormal. This is done with minimal delay, generally less than 10 milliseconds. In various embodiments, the information the browser agent provides includes one or more of the following: scripts found, types of scripts found, counts of scripts found, count of types of scripts found, paths to resources found, or any other appropriate information. In some embodiments, scripts are found and identified by using a hash function on the script. In some embodiments, scripts are found, templated (e.g., removing constants, variables, etc.), and identified using a hash function on the template. Determining a template of a script enables the type of script or the structure of the code in the script to be identified without the distraction of dynamically generated values for literals embedded within the script. In various embodiments, the agent quickly decides whether code is unusual by checking whether a hash of the script or script template is in a list of expected scripts or script templates. In various embodiments, appropriate actions are taken on code that is determined to be unusual, including being removed, quarantined, flagged, stored or reported on.

In some embodiments, user system 100 comprises a processor, a memory (e.g., to store and provide instructions to the processor, to store data, etc.), and an interface (e.g., to interface the processor with the memory, a network, a web application system, an analytics system, etc.). In some embodiments, web application system 104 comprises a processor, a memory (e.g., to store and provide instructions to the processor, to store data, etc.), and an interface (e.g., to interface the processor with the memory, a network, a user system, an analytics system, etc.). In some embodiments, analytics system 106 comprises a processor, a memory (e.g., to store and provide instructions to the processor, to store data, etc.), and an interface (e.g., to interface the processor with the memory, a network, a web application system, a user system, etc.). In various embodiments, user system 100, web application system 104, and/or analytics system 106 comprises one or more processors, one or more memories, one or more interfaces, one or more virtual systems, one or more servers, or any other appropriate hardware or software configurations to implement or execute a code analytics system.

Figure 2:
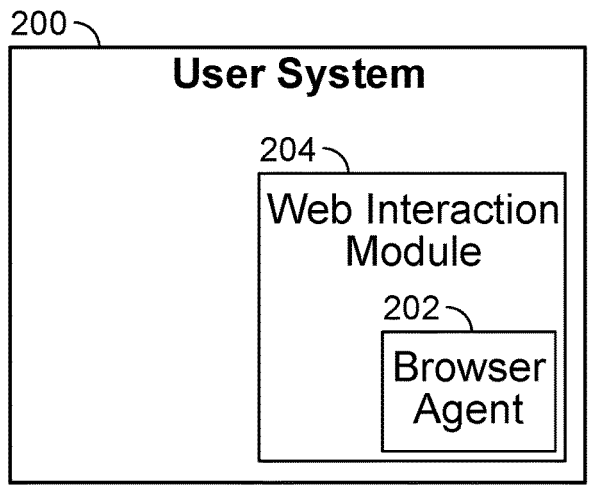
FIG. 2 is a block diagram illustrating an embodiment of a user system.

FIG. 2 is a block diagram illustrating an embodiment of a user system. In some embodiments, user system 200 of FIG. 2 implements user system 100 of FIG. 1. In the example shown, a user interacts with user system 200 to access content from a network (e.g., the internet). User system 200 uses web interaction module 204 (e.g., a browser, a web display subsystem, a user interface subsystem, a file transfer program, a shell, etc.) to interact with systems communicating via a network. In some embodiments, browser agent 202 monitors code running on web interaction module 204 and provides an analytics system information regarding the code (e.g., scripts running, count of scripts, script templates running, count of script templates, addresses accessed, detected content issues, etc.). In some embodiments, browser agent 202 receives instructions from an analytics system (e.g., to block, filter, not execute, quarantine, flag, etc. an unusual code, script, etc.). In various embodiments, browser agent 202 is received directly or indirectly from an application system or an analytics system and is installed to run with content from the application system in web interaction module 204.

Figure 3:
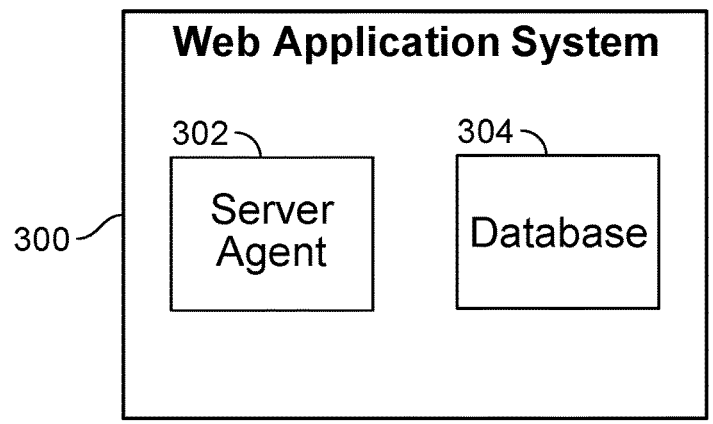
FIG. 3 is a block diagram illustrating an embodiment of a web application system.

FIG. 3 is a block diagram illustrating an embodiment of a web application system. In some embodiments, web application system 300 of FIG. 3 implements web application system 104 of FIG. 1. In the example shown, a user system interacts with web application system 300 to access content via a network (e.g., the internet). Web application system 300 provides content to and receives input from the user system. Web application system 300 provides information stored in database 304 to a user via a network. In various embodiments, provided information comprises web site information, web page information, web service information, payment processing information, or any other appropriate content. Server Agent 302 is used to inject CSP headers into HTTP responses sent to user systems. It also collects data on HTTP requests, analyzing them for indicators of malicious behavior. The server agent communicates with an analytics system by sending data collected on the HTTP requests and receiving policies describing what CSP headers to forward to user systems. In some embodiments, web application system 300 adds a browser agent to a web page provided to a user system automatically.

Figure 4:
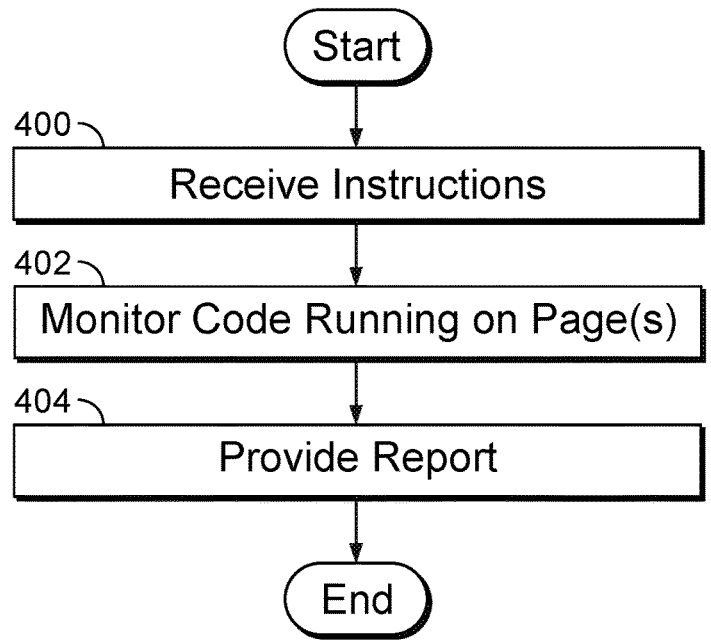
FIG. 4 is a flow diagram illustrating an embodiment of a process for detecting unusual code.

FIG. 4 is a flow diagram illustrating an embodiment of a process for detecting unusual code. In some embodiments, the process of FIG. 4 is executed by code running as a browser agent (e.g., analytics system browser agent 202 of FIG. 2 or analytics system server agent 302 of FIG. 3). In the example shown, in 400, instructions are received. For example, instructions and/or policies to monitor, filter, run, delete, quarantine, or any other appropriate instructions and/or policies are received. In 402, code running on page(s) is monitored. In 404, a report is provided. For example, scripts, script identifiers, counts, or any other appropriate data is reported to an analytics system. For another example, whether active enforcement or report only policies are used, a report is sent to the analytics system of the violation.

In some embodiments, the server agent sets CSPs in HTTP headers sent to the browser (browser agent) in each http response. In some embodiments, indicia of observed templates are augmented using CSPs to determine whether a web page is running malicious code. The browser, independent of the browser agent, interprets those headers and monitors the execution of the page for adherence to those policies. In the event that the policy is violated, the transaction is blocked by the browser in the event that the CSP includes active enforcement. In some embodiments, the CSP violations are reported to an analytics server independently without interaction with a browser agent.

In some embodiments, the initial policies used (both CSP and in-line script policies) are set to report only with no allowed browser behaviors. The data reported then shows all activity, both good and bad. Subsequently, the policies are updated to allow the good behavior and implicitly block the bad.

Figure 5:
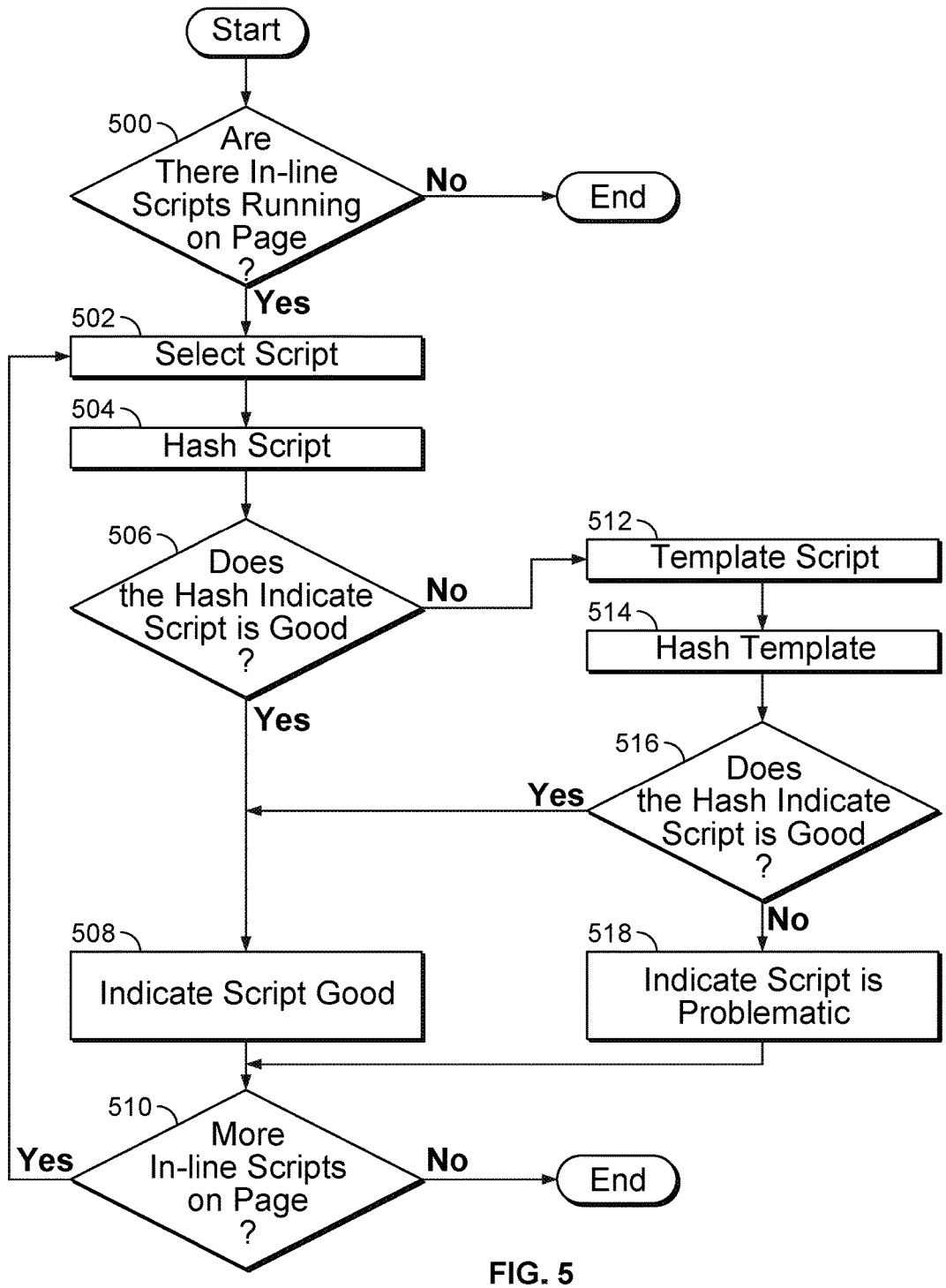
FIG. 5 is a flow diagram illustrating an embodiment of a process for monitoring a page.

FIG. 5 is a flow diagram illustrating an embodiment of a process for monitoring code running on web page(s). In some embodiments, the process of FIG. 5 is used to implement 402 of FIG. 4. In the example shown, in 500, it is determined whether there are in-line scripts running on a page. For example, a code block is detected running as part of a web page. In the event that there are not in-line scripts running on the page, the process ends. In the event that there are in-line scripts running on a page, then in 502 a script is selected. In 504, the script is hashed. For example, the block of code of the web page is hashed to generate an identifier. In 506, it is determined whether the hash indicates that the script is good. For example, the hash is compared to a list of valid and safe scripts and it is determined whether the script matches a predetermined list of good scripts. In the event that the hash indicates that the script is good, then in 508 a script is indicated as good and control passes to 510. In the event that the hash does not indicate that a script is good, then in 512, the script is templated. In 514, the template is hashed. For example, the template of the code of the web page is hashed to generate a template identifier. In 516, it is determined whether the hash indicates that the script is good. For example, the hash of the template is compared to a list of valid and safe templates of scripts and it is determined whether the template of the script matches a template of a script that appears in a predetermined list of good template scripts. In the event that the hash does not indicate that the script is good, in 518, it is indicated that the script is problematic. In the event that the hash indicates a script is good, then control passes to 508. In 510, it is determined whether there are more scripts on a page. In the event that there are more in-line scripts, then control passes to 502. In the event that there are no more in-line scripts, then the process ends.

Figure 6:
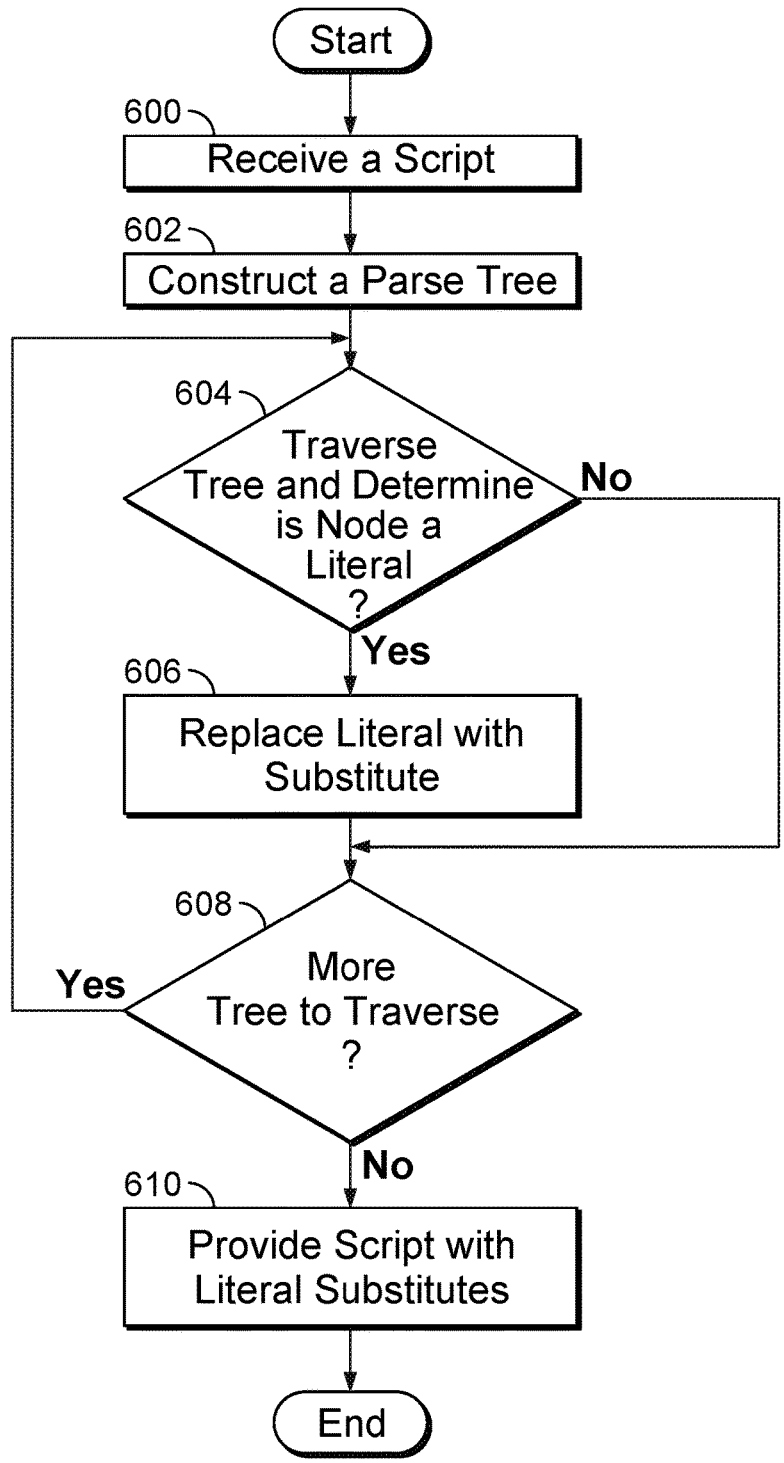
FIG. 6 is a flow diagram illustrating an embodiment of a process for templating a script.

FIG. 6 is a flow diagram illustrating an embodiment of a process for templating a script. In some embodiments, the process of FIG. 6 is used to implement 512 of FIG. 5. In the example shown, in 600 a script is received. In 602, a parse tree is constructed. In 604, it is determined whether a node is a literal while traversing the tree. For example, a script is parsed into a parse tree and the tree nodes corresponding to literal values are flagged. In the event that there are literals in the element, in 606 the literals are replaced with a substitute. For example, a parsed template includes a substitute for a literal in the code or substitutes for data structures constructed entirely out of literals. In various embodiments, literals comprise simple values, such as a number or string, or complex data structures containing multiple literal primitives, such as a map or list object, or any other appropriate data. Once all such nodes are reduced and replaced, control is passed to 608. In the event that there are no literals in the element at 604, then control passes to 608. In 608, it is determined whether there is more tree to traverse. In the event that there is more tree to traverse, control passes to 604. In the event that there is not more tree to traverse, in 610 the script is provided with literal substitutes. For example, a template of the script is provided.

In some embodiments, a parse tree is constructed, then the parse tree is serialized and recursively traversed. When serializing, nodes that are literals, or who's children are all literals, are collapsed into a single element and replaced with a placeholder. In various embodiments, the placeholder comprises an indication of the type of the container (e.g., a list of literals is noted as "[?]," a single element is noted as "?," etc.) or any other appropriate indication.

Figure 7A:
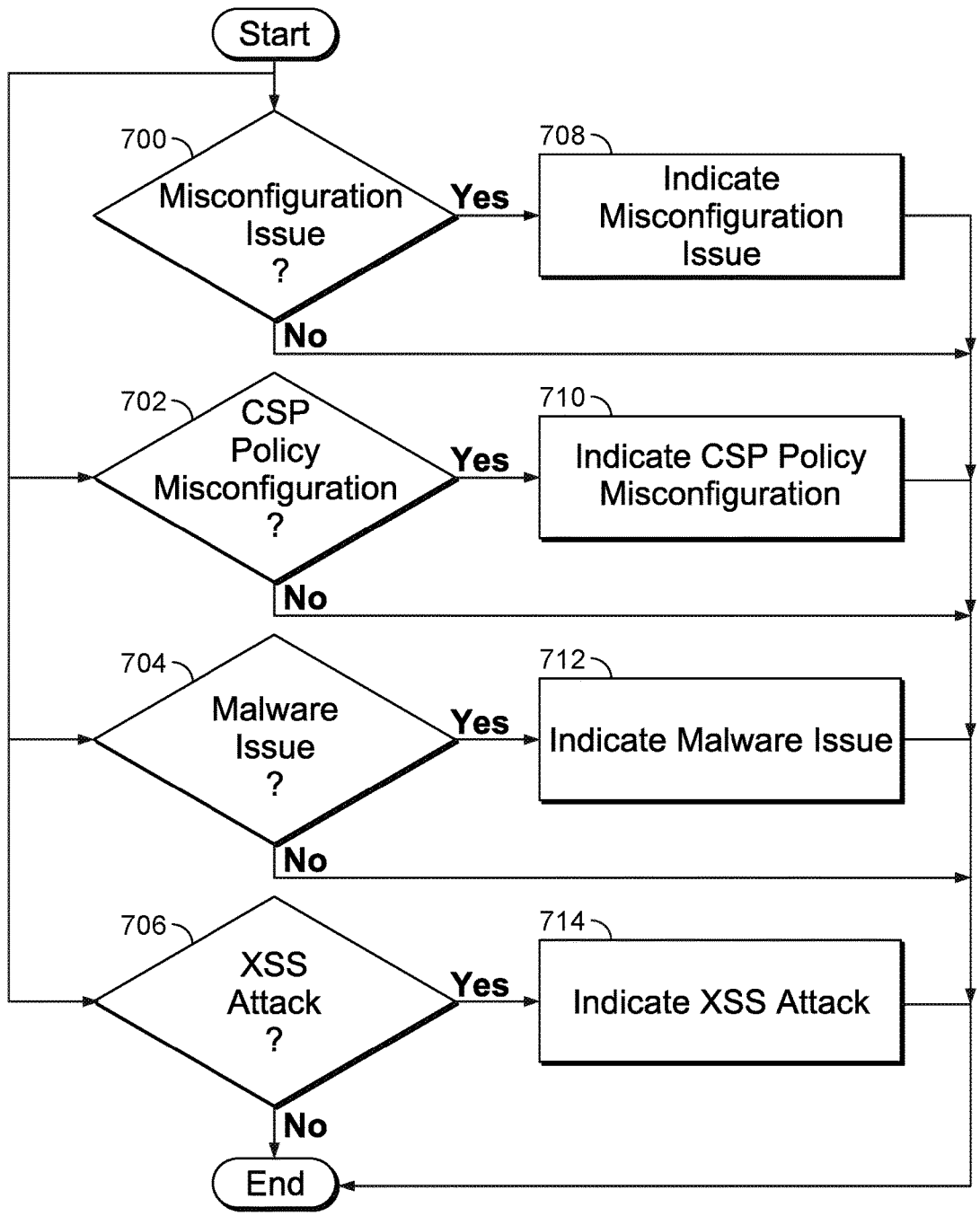
FIG. 7A is a flow diagram illustrating an embodiment of a process for indicating a problem.

In some embodiments, an untemplated script is as follows:
  var v1=1;
  var v2=-1;
  var v3='foo';
  var v4='foo'+'bar';
  var v5=[1, 2, 'foo', 'bar', -1];
  var v6=[1, 2, v1, 'foo', 'bar'];
  var v7={a:'foo', 'b':'bar', c:{zz:22, dd:33, aa: {a:2}}, d: {1:foobar}};
  var v8={a:1, b:2, c:{aa:11,bb:22}};
  var v9={a:1, b:2};
and the corresponding templated script is as follows:
  var v1='?';
  var v2='?';
  var v3='?';
  var v4='?'+'?';
  var v5=['?'];
  var v6=[
  '?',
  v1,
  '?'
  ];
  var v7={
  '?': '?',
  d: {'?': foobar}
  };
  var v8={'?': '?'};
  var v9={'?': '?'};

FIG. 7A is a flow diagram illustrating an embodiment of a process for indicating a problem. In various embodiments, the process of FIG. 7A is used to implement 506 or 516 of FIG. 5. In the example shown, process steps 700, 702, 704, and 706 are performed in parallel. In various embodiments, process steps are performed sequentially, in a combination of parallel and serial configurations, or any other appropriate manner. In 700, it is determined whether there is a misconfiguration issue. In the event that there is a misconfiguration issue, in 708, a misconfiguration issue is indicated, and the process ends. In the event that there is not a misconfiguration issue, the process ends. In 702, it is determined whether there is a CSP misconfiguration. In the event that there is a CSP misconfiguration, in 710 a CSP misconfiguration is indicated, and the process ends. In the event that there is not a CSP misconfiguration, the process ends. In 704, it is determined whether there is a malware issue. In the event that there is a malware issue, in 712, a malware issue is indicated, and the process ends. In the event that there is not a malware issue, the process ends. In 706, it is determined whether there is an XSS attack. In the event that there is an XSS attack, in 714 an XSS attack is indicated, and the process ends. In the event that there is not a script issue, the process ends.

FIG. 7B is a diagram illustrating an embodiment of a table for determining a cross-site scripting issue. In some embodiments, the table of FIG. 7B is used to implement 706 of FIG. 7A. In the example shown, table 750 includes rows for hour, new script count, all scripts encountered, and new scripts this hour. In some embodiments, identifying candidate XSS in-line scripts includes monitoring the change in the number of unique scripts seen on a particular doc-URI over a longer period of time (e.g., two days). If the site does not have dynamic scripts, or the dynamic scripts are identifiable and can be filtered from classification, then it is suspicious for a previously unknown script template to appear after a period where page views did not introduce new scripts on a particular route or doc-URI. Unique metrics per hour on the doc-URI dimension provide the number of unique scripts seen during that time bucket. To translate these unique sets into a change in unique scripts seen, one loops over the timeline per doc-URI, and builds a cumulative set of all scripts seen, hour by hour, and then records the increase in cardinality for each step. In the example shown, in hour 6 there is a new script after a period of stability (e.g., in hours 3, 4, and 5). If there were a larger number of scripts added during this candidate time bucket they would all be discounted as being more likely a site upgrade that introduces new scripts. The global new script appearance rate can also be used to infer this. New scripts are identified by checking, by script ID in the batch being evaluated, if no previous buckets of metrics for that script exist in the evaluation window. If a script is identified as being new, in a given bucket, the doc-URIs are checked to see if they fit the previously explained criteria for being stable, and then having a new script appear.

In the example shown, table 750 is used to track the number of new scripts encountered, all scripts encountered, and all new scripts encountered within a defined time bucket (e.g., scripts in one hour). The rows of this table have the scope of a single page, generally identified by URL. A script is determined to be a potential XSS attack in the event that the script is encountered as a new script after a significant period of time (e.g., a predetermined period of time, 2 hours, etc.) in which the page is viewed repeatedly but no new scripts are encountered.

Figure 8:
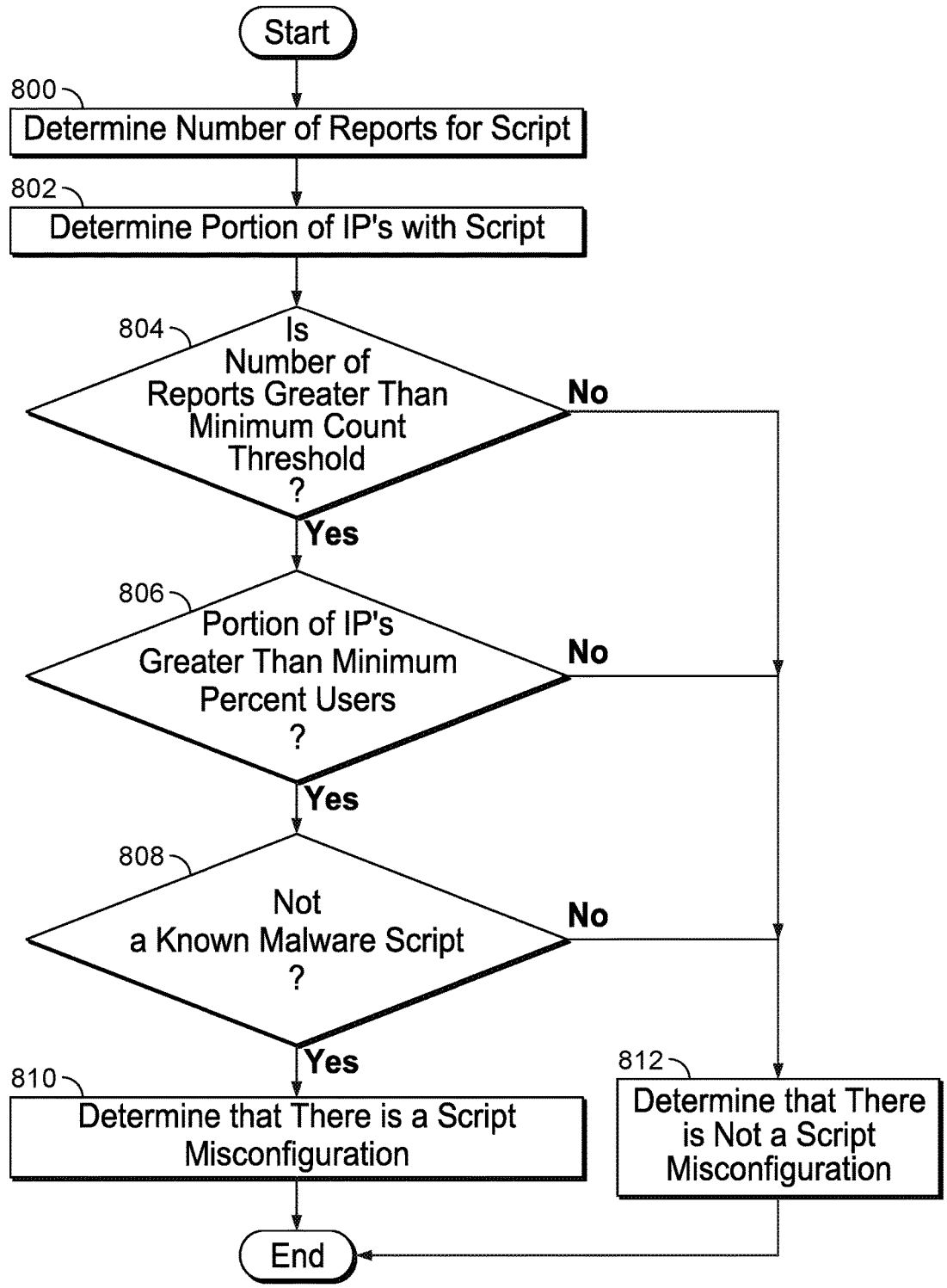
FIG. 8 is a flow diagram illustrating an embodiment of a process for determining a likely misconfiguration issue.

FIG. 8 is a flow diagram illustrating an embodiment of a process for determining a likely misconfiguration issue. In some embodiments, the process of FIG. 8 is used to implement 700 of FIG. 7A. In the example shown, in 800, a number of reports for a script is determined. For example, the number of a script occurrence or template of a script occurrence is determined. In various embodiments, the number of script occurrences or the number of templates of script occurrences comprises indicia associated with code (e.g., scripts). In 802, a portion of IPs with script is determined. For example, the number of distinct IP addresses is counted for events where a template script is identified (e.g., a script with a specific value for a hash of the template derived from the script). In 804, it is determined whether the number of reports is greater than a minimum count threshold. For example, the number of reports of a given script is greater than 100. In the event that the number of reports is not greater than the minimum count threshold, then in 812 it is determined that there is not a script misconfiguration. In the event that the number of reports is greater than the minimum count threshold, then in 806 it is determined whether the portion of IPs is greater than a minimum percent of users. For example, the portion is most users (e.g., a portion greater than 50%). In the event that the portion of IPs is not greater than the minimum percent of users, control passes to 812. In the event that the portion of IPs is greater than the minimum percent of users, then in 808 it is determined whether the script is not a known malware script. In the event that the script is a known malware script, control passes to 812. In the event that the script is not a known malware script, then in 810 it is determined that there is a script misconfiguration.

Figure 9:
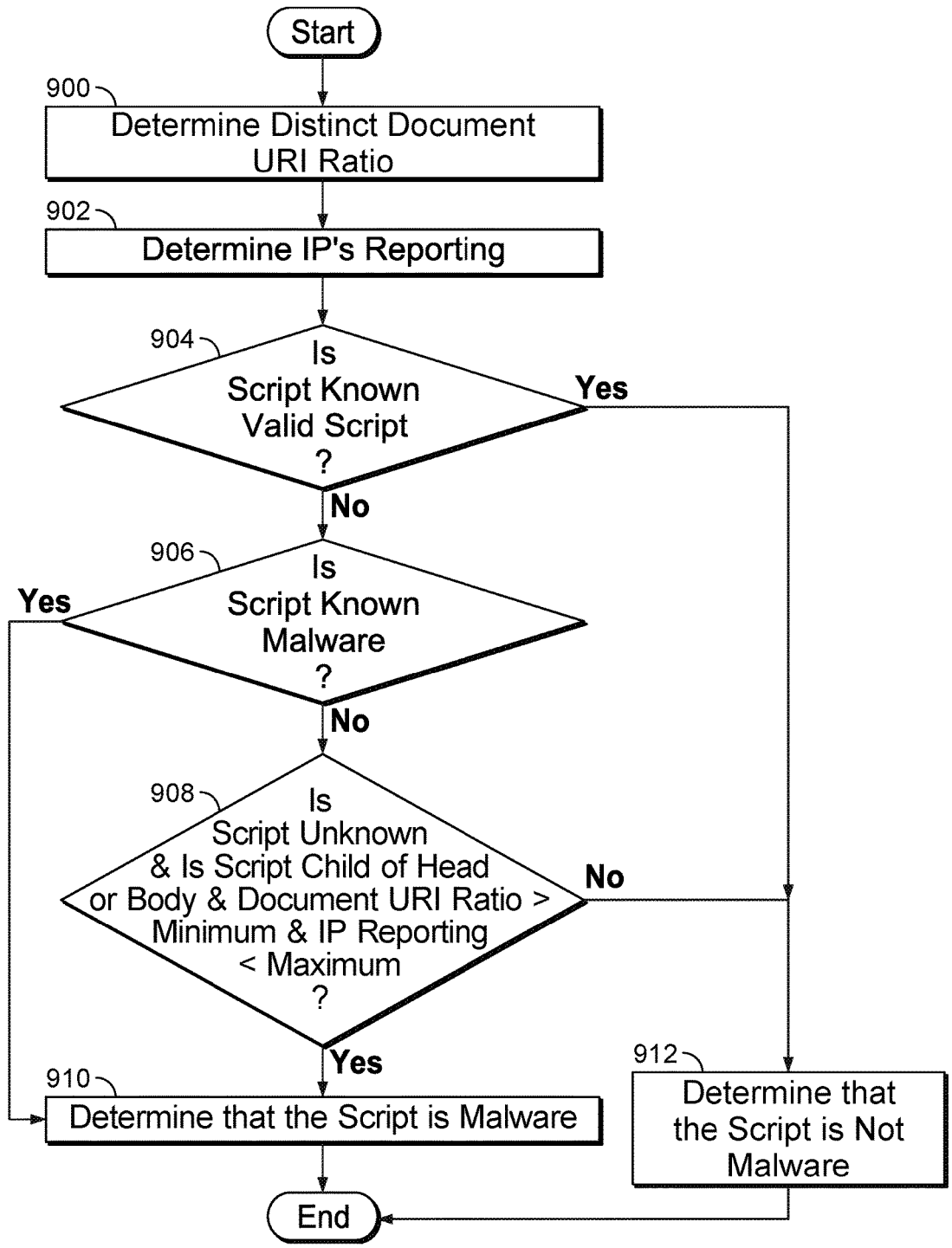
FIG. 9 is a flow diagram illustrating an embodiment of a process for determining a malware issue.

FIG. 9 is a flow diagram illustrating an embodiment of a process for determining a malware issue. In some embodiments, the process for FIG. 9 is used to implement 704 of FIG. 7A. In the example shown, in 900, a distinct document URI ratio is determined. In 902, IPs reporting are determined. In 904, it is determined whether the script is a known valid script. In the event that the script is a known valid script, then in 912 the script is determined to be not malware. In the event that the script is not a known valid script, then in 906 it is determined whether the script is known malware. In the event that the script is known malware, then in 910 it is determined that the script is malware. In the event that the script is not known malware, then in 908 it is determined whether the script is unknown and whether the script is a child of a head or body and whether the document URI ratio is greater than a minimum and whether IP reporting is less than a maximum. In the event that the script is unknown and the script is a child of a head or body and the document URI ratio is greater than the minimum and IP reporting is less than the maximum, then control passes to 910. In the event that the script is not unknown or the script is not a child of a head or body or the document URI ratio is not greater than the minimum or IP reporting is not less than the maximum, then control passes to 912.

Figure 10:
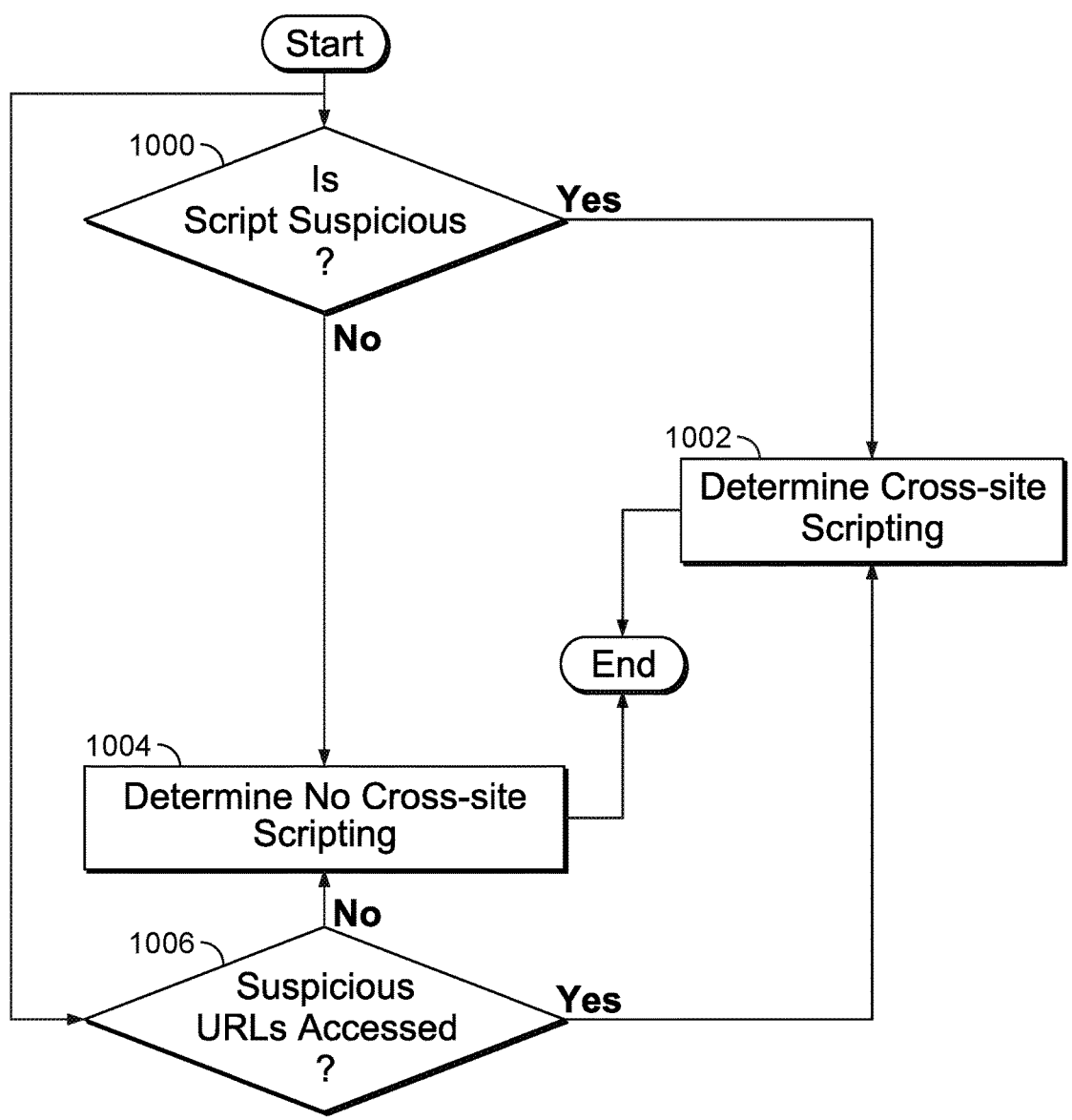
FIG. 10 is a flow diagram illustrating an embodiment of a process for determining a scripting issue.

FIG. 10 is a flow diagram illustrating an embodiment of a process for determining a cross-site scripting issue. In some embodiments, the process for FIG. 10 is used to implement 706 of FIG. 7A. In the example shown, in 1000, it is determined whether the script is suspicious. For example, the script is suspicious in the event that the script is similar to an existing known bad script. In the event that the script is suspicious, then in 1002 cross-site scripting is determined and the process ends. In the event that the script is not suspicious, then in 1004 no cross-site scripting is determined and the process ends. In 1006, it is determined whether suspicious URL's are accessed. For example, the addresses accessed are compared to a list of known suspect IP addresses. In various embodiments, the address is a suspect address and in one or more of the following categories: malware host IP, shareware IP, freeware IP, hacking IP, key logger IP, advertising IP, phishing IP, fraud IP, spyware IP, bot note IP, spam IP, or any other category of suspect address. In the event that suspicious URL's are accessed, then control passes to 1002. In the event that suspicious URL's are not accessed, then control passes to 1004. In some embodiments, the process of 1000 and 1006 are performed serially instead of in parallel as shown above.

Figure 11:
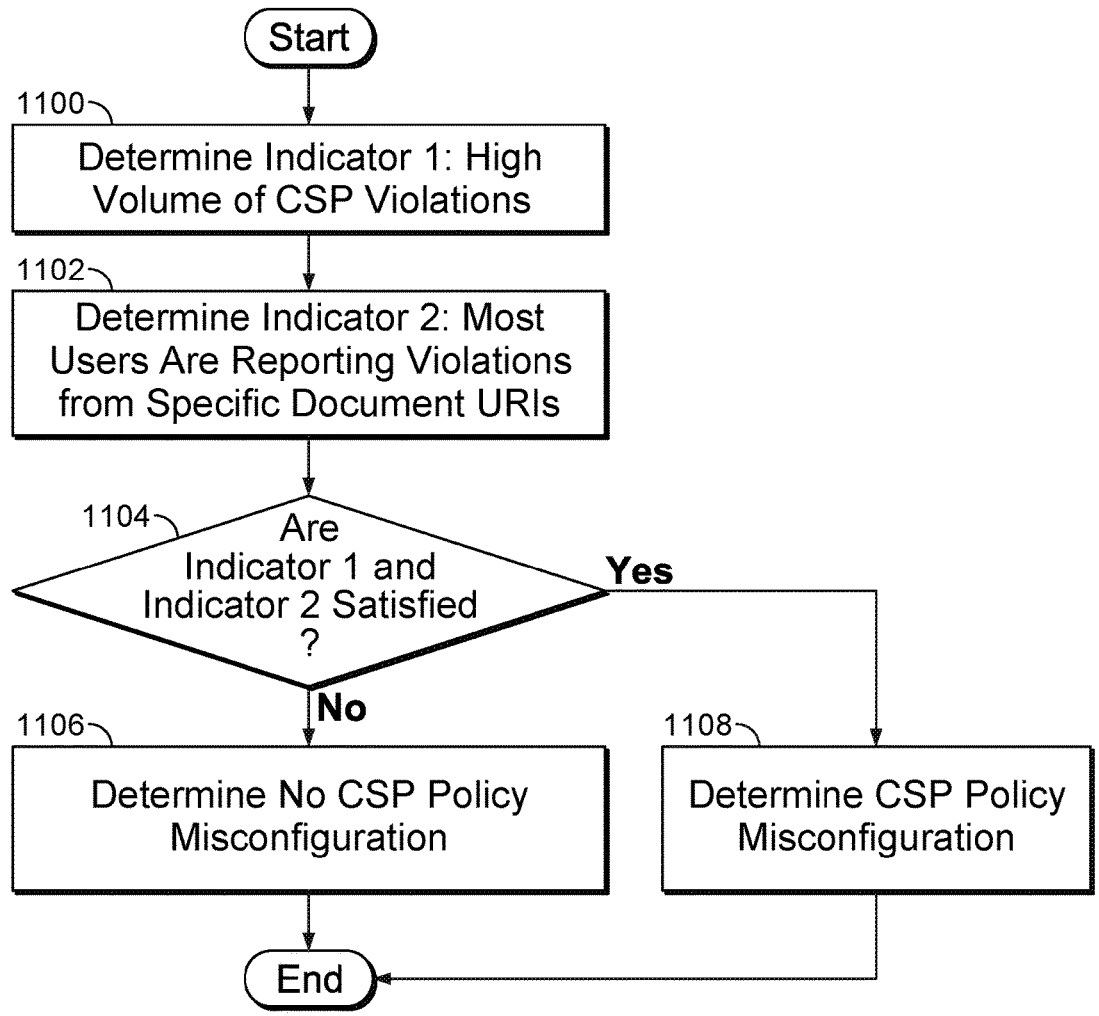
FIG. 11 is a flow diagram illustrating an embodiment of a process for determining a content issue.

FIG. 11 is a flow diagram illustrating an embodiment of a process for determining a content security policy misconfiguration. In some embodiments, the process for FIG. 11 is used to implement 702 of FIG. 7A. In the example shown, in 1100, indicator 1—high volume of CSP violations—is determined. For example, a significant uptick from normal of content security policy violations is determined. In some embodiments, a portion of blocked URIs associated with the CSP events is determined and the volume of CSPs is based at least in part on the portion. In 1102, indicator 2—most users are reporting violations from specific document URIs—is determined. For example, a portion of the violations coming from specific URIs is determined. In some embodiments, the portion is filtered and needs to be greater than a minimum percent (e.g., 50%). In 1104, it is determined whether indicator 1 and indicator 2 are satisfied. In the event that indicator 1 and indicator 2 are satisfied, then in 1108 a CSP misconfiguration is determined. In the event that indicator 1 and indicator 2 are not satisfied, then in 1106 no CSP misconfiguration is determined.

In some embodiments, the causes of violation events sent from a browser to a system using an agent (e.g., a javascript agent) are classified (e.g., analyzed under a number of scenarios).

FIGS. 12A and 12B are tables illustrating an embodiment of a malware scenario. In some embodiments, the tables of FIG. 12A and FIG. 12B are generated using the system of FIG. 1. In the example shown, under an adware/malware scenario for one client IP (C-IP), indicators of a problem are:
  Will see CSP violations of blocked URIs.
    Strong indicators: Lower reputation scores. Category !=general web
    ex: script-src, http://c.dealply.com, Category=General Web, reputation=suspicious
    ex: img-src www.ajaxcdn.org, Category=Parked Domain, reputation=moderate risk
  May see an in-line script.
    Script will either be categorized as adware or be uncategorized. Will NOT be categorized as something OK.
    Script likely a child of head or body. Likely close to the beginning or end tag.
  Behavior will be consistent across lots of document URIs on the site for this user.
  The behavior will be inconsistent with other users, meaning the CSP violation (directive/blocked domain) and script will not show up for a high percentage of users.

FIG. 13 is a table illustrating an embodiment of an XSS injected into an existing script scenario. In some embodiments, the table of FIG. 13 is generated using the system of FIG. 1. In the example shown, under an XSS injected into an existing script scenario for one client IP (C-IP), indicators of a problem are:
  May see CSP violations of blocked URIs.
    Strong indicators: Lower reputation scores. Category !=general web
    script-src, http://www.eshopcomp.com, Category=Malware, reputation=high-risk
  Will see an in-line script.
    Strong indicator: Script is not a direct child of head or body. (sufficient but not necessary)
    Script will probably be uncategorized. May be a known bad script.
    Strong indicator: Script has high similarity to known good script, particularly one that is known to be dynamic.
  Behavior likely to be limited to a small number of URIs.
  The behavior will likely be inconsistent with other users, meaning the CSP violation (directive/blocked domain) and script will not show up for a high percentage of users.

FIG. 14 are tables illustrating an embodiment of a new script scenario. In some embodiments, the tables of FIG. 14 are generated using the system of FIG. 1. In the example shown, under a new script scenario for one client IP (C-IP), indicators of a problem are:

Will see a new script element.
 Not similar to existing script.
 Strong indicator: Likely inside the DOM, not a child of body or head. (sufficient, not necessary)
 Not likely to be categorized as known.
 Viewing context of surrounding DOM elements will likely make injection obvious.
May see CSP violations.
 Strong indicators: Lower reputation scores. Category !=general web
 script-src, http://www.eshopcomp.com, Category=Malware, reputation=high-risk
Scope will be limited: Small number of users. Limited number of doc URLs.

FIG. 15 are table illustrating an embodiment of a CSP misconfiguration scenario. In some embodiments, the tables of FIG. 15 are generated using the system of FIG. 1. In the example shown, under a CSP misconfiguration scenario for all client IPs (C-IP), indicators of a problem are:
High volume of CSP violations.
 CSP blocked URIs will be either self, ad network, or general web. Will not be a high risk security category.
 In-line scripts will be unknown or categorized as something like "new relic," i.e., commonly used utilities.
 Violations likely to occur for most users going to a given doc URI. Not all doc URIs need to be affected.

FIG. 16 is a table illustrating an embodiment of an in-line script policy misconfiguration scenario. In some embodiments, the tables of FIG. 16 are generated using the system of FIG. 1. In the example shown, under an in-line script policy misconfiguration scenario for all client IPs (C-IP), indicators of a problem are:
Large number of in-line script reports for the js agent.
Reports affect most users.
High counts on individual script signatures.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting unusual code operating in a browser, comprising:
 a processor to:
  determine that a block of code is running on a web page;
  parse the block of code into a parsed template;
  obtain indicia associated with the block of code; and
  determine that the parsed template is unusual based at least in part on the parsed template and the indicia, comprising to:
   determine whether a misconfiguration issue exists, comprising to:
    determine whether a number of reports for a script associated with the block of code is equal to or exceeds a minimum count threshold, the minimum count threshold being 100; and
    in response to a determination that the number of reports for a script associated with the block of code is equal to or exceeds the minimum count threshold:
     determine whether a portion of IPs with the block of code is equal to or exceeds a minimum percent of users, the minimum percent of users being 50 percent:
      in response to a determination that the portion of IPs with the block of code is greater than or equal to the minimum percent of users:
       determine whether the script is not a known malware script; and
       in response to a determination that the script is not a known malware script, determine that a script misconfiguration exists; and
      in response to a determination that the portion of IPs with the block of code is less than the minimum percent of users, omit determining that the script misconfiguration exists; and
 a memory coupled with the processor, wherein the memory is configured to provide the processor with instructions.

2. The system as in claim 1, wherein the block of code is hashed.

3. The system as in claim 1, wherein the parsed template is hashed.

4. The system as in claim 3, wherein an identifier is generated from hashing the parsed template.

5. The system as in claim 1, wherein the parsed template includes a substitute for a literal in the code.

6. The system as in claim 1, wherein the parsed template includes substitutes for data structures constructed entirely out of literals.

7. The system as in claim 1, wherein one of the indicia associated with the block of code comprises a count of occurrence of the block of code.

8. The system as in claim 1, wherein one of the indicia associated with the block of code comprises a count of occurrence of the parsed template.

9. The system as in claim 1, wherein one of the indicia associated with the block of code comprises the portion of IPs with the block of code.

10. The system as in claim 1, wherein the indicia are augmented using CSPs to determine whether a web page is running malicious code.

11. The system as in claim 1, wherein the processor is to receive instructions.

12. The system as in claim 11, wherein the instructions comprise instructions to monitor.

13. The system as in claim 11, wherein the instructions comprise instructions to filter.

14. The system as in claim 11, wherein the instructions comprise instructions to delete.

15. The system as in claim 11, wherein the instructions comprise instructions to quarantine.

16. A method for detecting unusual code operating in a browser agent, comprising:
 determining, using a processor, that a block of code is running on a web page;
 parsing the block of code into a parsed template;
 obtaining indicia associated with the block of code; and
 determining that the parsed template is unusual based at least in part on the parsed template and the indicia, comprising:
  determining whether a misconfiguration issue exists, comprising:
   determining whether a number of reports for a script associated with the block of code is equal to or exceeds a minimum count threshold, the minimum count threshold being 100; and
   in response to a determination that the number of reports for a script associated with the block of code is equal to or exceeds the minimum count threshold:

determining whether a portion of IPs with the block of code is equal to or exceeds a minimum percent of users, the minimum percent of users being 50 percent;

in response to a determination that the portion of IPs with the block of code is greater than or equal to the minimum percent of users:
  determining whether the script is not a known malware script; and
  in response to a determination that the script is not a known malware script, determining that a script misconfiguration exists; and in response to a determination that the portion of IPs with the block of code is less than the minimum percent of users, omitting determining that the script misconfiguration exists.

17. A computer program product for detecting unusual code operating in a browser agent, the computer program product being embodied in a non-transitory computer readable storage medium and comprising computer instructions for:

determining, using a processor, that a block of code is running on a web page;

parsing the block of code into a parsed template;

obtaining indicia associated with the block of code; and determining that the parsed template is unusual based at least in part on the parsed template and the indicia, comprising:

determining whether a misconfiguration issue exists, comprising:
  determining whether a number of reports for a script associated with the block of code is equal to or exceeds a minimum count threshold, the minimum count threshold being 100; and
  in response to a determination that the number of reports for a script associated with the block of code is equal to or exceeds the minimum count threshold:
    determining whether a portion of IPs with the block of code is equal to or exceeds a minimum percent of users, the minimum percent of users being 50 percent;
    in response to a determination that the portion of IPs with the block of code is greater than or equal to the minimum percent of users:
      determining whether the script is not a known malware script; and
      in response to a determination that the script is not a known malware script, determining that a script misconfiguration exists; and
    in response to a determination that the portion of IPs with the block of code is less than the minimum percent of users, omitting determining that the script misconfiguration exists.

* * * * *